United States Patent
Nose et al.

(10) Patent No.: US 7,208,433 B2
(45) Date of Patent: Apr. 24, 2007

(54) CERAMIC PLATES FOR SIDE DAMS OF TWIN-DRUM CONTINUOUS STRIP CASTERS

(75) Inventors: Tetsuro Nose, Futtsu (JP); Tomohide Takeuchi, Futtsu (JP)

(73) Assignee: Nippon Steel Corporation, Tokyo (JP)

( * ) Notice: Subject to any disclaimer, the term of this patent is extended or adjusted under 35 U.S.C. 154(b) by 113 days.

(21) Appl. No.: 10/509,925

(22) PCT Filed: Mar. 31, 2003

(86) PCT No.: PCT/JP03/04090

§ 371 (c)(1),
(2), (4) Date: Jun. 28, 2005

(87) PCT Pub. No.: WO03/082498

PCT Pub. Date: Oct. 9, 2003

(65) Prior Publication Data

US 2006/0166808 A1    Jul. 27, 2006

(30) Foreign Application Priority Data

Apr. 2, 2002  (JP) .............................. 2002-100372

(51) Int. Cl.
C04B 35/5835 (2006.01)
C04B 35/599 (2006.01)
B22D 11/06 (2006.01)

(52) U.S. Cl. .................. 501/96.4; 501/98.2; 501/98.3; 164/428; 164/480

(58) Field of Classification Search .............. 501/96.4, 501/98.2, 98.3; 164/428, 480
See application file for complete search history.

(56) References Cited

U.S. PATENT DOCUMENTS

| 6,667,263 B1 * | 12/2003 | Guillo et al. .............. 501/96.4 |
| 6,843,304 B2 * | 1/2005 | Takeuchi et al. ........... 164/428 |
| 7,098,159 B2 * | 8/2006 | Krolikowski .............. 501/96.4 |

FOREIGN PATENT DOCUMENTS

| EP | 0 338 718 A | 10/1989 |
| EP | 0 654 456 A | 5/1995 |
| JP | 8-164452 | 6/1996 |
| JP | 8-243689 | 9/1996 |
| JP | 8-243690 | 9/1996 |
| JP | 8-243691 | 9/1996 |
| JP | 2001-150106 | 6/2001 |

OTHER PUBLICATIONS

Mamoru Mitomo et al. "Stability of α-Sialons in Low Temperature Annealing" Journal of the European Ceramic Society Elsevier UK, vol. 19, No. 1, 1999, pp. 7-15.
Patent Abstracts of Japan, JP 07165462 A, Jun. 27, 1995.

* cited by examiner

Primary Examiner—Karl Group
(74) Attorney, Agent, or Firm—Kenyon & Kenyon LLP

(57) ABSTRACT

Ceramic plates for side dams of twin-drum continuous strip casters comprising a REAG phase of 10 to 90 vol. %, a Sialon phase of 5 to 50 vol. %, a BN phase of 5 to 50 vol. % and an amorphous phase of over 0 to 20 vol. %, with the REAG phase comprising at least one rare-earth aluminum garnet phase selected from YAG, ErAG, YbAG and DyAG phases and the Sialon phase having a chemical formula, $Si_{6-z}Al_zO_zN_{8-z}$, wherein Z is between 0.05 and 1.9.

5 Claims, 1 Drawing Sheet

CERAMIC PLATES FOR SIDE DAMS OF TWIN-DRUM CONTINUOUS STRIP CASTERS

TECHNICAL FIELD

This invention relates to ceramic plates for side dams that form a liquid steel pool, with a pair of cooling drums interposed therebetween, in twin-drum continuous strip casters for continuously casting strips of stainless and other steels while forming a solidifying shell at the peripheral surface of the pair of cooling drums having parallel axes and rotating in opposite directions.

BACKGROUND ART

Side dams forming a liquid steel pool, with a pair of cooling drums interposed therebetween, in twin-drum continuous strip casters are required to have high corrosion resistance against stainless and other steels, high wear resistance to friction with the drums, high resistance to the thermal shock occurring when hot metal is poured and a low enough thermal conductivity to inhibit the adhesion of skulls.

Conventionally $Al_2O_3+C$, $Si_3N_4$, BN, Sialon, AlN, $TiB_2$, TiN, $Si_3N_4$+BN, $Si_3N_4$+AlN+BN, Sialon+BN, Sialon+AlN+BN, Sialon+$TiB_2$+BN, Sialon+TiN+BN and some other types of ceramics have been used for side dams. However, none of them have proved to have the long life required of side dams.

Generally $Al_2O_3+C$ ceramics, which have high corrosion resistance to molten steel and good thermal shock resistance, tend to become roughened where contact is made with moving drums and, thus, show poor sealability to molten steel. While having high resistance to penetration of molten steel, $Si_3N_4$, Sialon, AlN, $TiB_2$, and TiN ceramics do not have good corrosion resistance. Because of poor thermal shock resistance, they tend to crack when subjected alone to rapid heating and cooling.

While having good thermal shock resistance, BN ceramics are soft and do not have good wear resistance. Because of high thermal conductivity, they tend to cause the adhesion of skulls to plates, thereby inhibiting the implementation of stable continuous casting.

Combinations of BN ceramics with $Si_3N_4$, Sialon, AlN, $TiB_2$, and TiN ceramics sometimes exhibit better thermal shock and wear resistance than those seen when they are used alone. However, the problem of poor corrosion resistance remains unsolved.

As described above, conventional ceramics do not have the good reliability required of structural materials because they do not have the desired high corrosion, wear and thermal shock resistances and do not have low thermal conductivity.

SUMMARY OF THE INVENTION

The object of the present invention is to provide ceramic plates for side dams of twin-drum continuous strip casters having high corrosion, wear and thermal shock resistances and low thermal conductivity.

The ceramic plates for side dams of twin-drum continuous strip casters according to this invention comprise a REAG phase of 10 to 90 vol. %, a Sialon phase of 5 to 50 vol. % and a BN phase of 5 to 50 vol. %, or a REAG phase of 10 to 90 vol. %, a Sialon phase of 5 to 50 vol. %, a BN phase of 5 to 50 vol. % and an amorphous phase of more than 0 to not greater than 20 vol. %.

Preferably the REAG phase comprises at least one rare-earth aluminum garnet phase selected from YAG, ErAG, YbAG and DyAG phases and the Sialon phase has a chemical formula $Si_{6-z}Al_zO_zN_{8-z}$ wherein Z is between 0.05 and 1.9. A relative density of 80% or more is particularly preferable.

THE MOST PREFERRED EMBODIMENT

Figure 1:
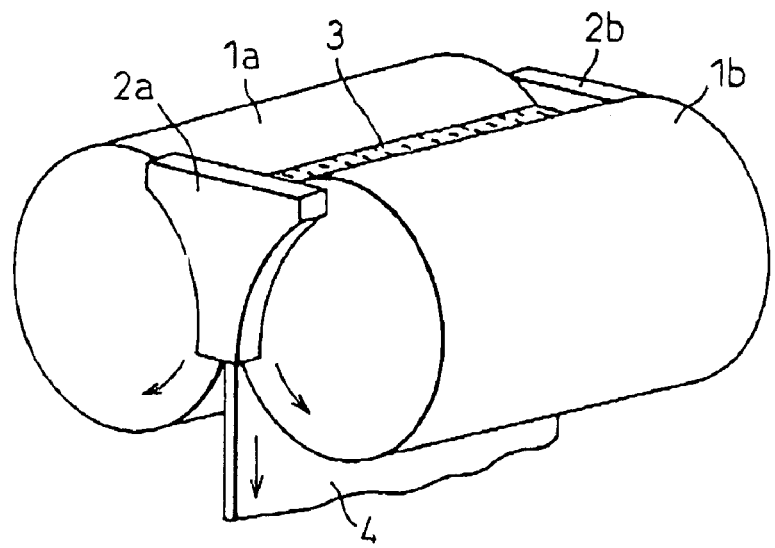
FIG. 1 is a perspective view of a twin-drum continuous strip caster.

Through various studies the inventor discovered that ceramic plates having high corrosion, wear and thermal shock resistances and low thermal conductivity by controlling the percentages of the REAG, Sialon and BN (plus amorphous) phases to within specified ranges.

Here, the REAG phase is a high melting point compound comprising rare-earth metal oxide $RE_2O_3$ and aluminum oxide in the proportions of $3RE_2O_3:5Al_2O_3$. The REAG phase according to this invention comprises at least one rare-earth aluminum garnet phase selected from YAG, ErAG, YbAG and DyAG phases. The REAG phase may comprise two or more rare-earth aluminum garnet phases in given proportions.

Each of the YAG, ErAG, YbAG and DyAG phases comprises $3Y_2O_3:5Al_2O_3$, $3Er_2O_3:5Al_2O_3$, $3Yb_2O_3:5Al_2O_3$, and $3Dy_2O_3:5Al_2O_3$.

In the course of the studies it was discovered that the REAG phase is very stable when in contact with the molten metal of stainless and other steels and scarcely forms product of reaction at the contact interface.

The cause of this high corrosion resistance is inferred to be as follows: When rare-earth oxides are present alone in ceramics, they react with $Fe_2O_3$ in molten steel and form rare-earth iron garnet, thereby allowing the progress of erosion. If, in contrast, they are formed in advance as a stable REAG phase, rare-earth oxides inhibit the reaction with $Fe_2O_3$.

The ceramic plates according to this invention comprise a REAG phase of 10 to 90 vol. %, a Sialon phase of 5 to 50 vol. %, a BN phase of 5 to 50 vol. % and an amorphous phase of more than 0 to not greater than 20 vol. %. Adequate corrosion resistance is unobtainable if the REAG phase is less than 10 vol. %.

The Sialon phase does not provide high strength and thermal shock if the quantity thereof is less than 5 vol. % and does not have high corrosion resistance if the quantity thereof is over 50 vol. %. It is also preferable that z in the chemical formula for the Sialon phase $Si_{6-z}Al_zO_zN_{8-z}$ is 0.05 to 1.9. If Z is smaller than 0.05, high corrosion resistance is unobtainable and if Z exceeds 1.9 adequate thermal shock resistance is unobtainable. It is particularly preferable that Z is between 0.1 and 1.5.

For the attainment of high thermal shock resistance, it is preferable to add the BN phase. It is desirable to add a BN phase of 5 or more vol. % as adequate thermal shock resistance is unattainable thereunder. If the quantity of the BN phase exceeds 50 vol. %, however, hardness drops significantly. Wear resistance drops, thermal conductivity rises, and a propensity for skull adhesion appears.

It is therefore preferable to add the BN phase in the range of 5 to 50 vol. % and, particularly, between 15 and 40 vol. %. To obtain high wear resistance, it is preferable that the h-BN phase having a hexagonal crystal structure is used. The t-BN phase having a random crystal structure may also be used.

Essentially, an amorphous phase need not be contained. If the quantity of the amorphous phase exceeds 20 vol. %, corrosion resistance and high-temperature strength sometimes deteriorate. Therefore, the preferable quantity of the amorphous phase is between 0 and 20 vol. %. While the preferable constituent elements of the amorphous phase are rare-earth elements, aluminum, silicon, oxygen, nitrogen and some unavoidable impurities may also be contained.

It is furthermore preferable that the ceramic plates according to this invention have a relative density of 80% or higher. At under 80%, adequate wear and corrosion resistances are unobtainable. The particularly preferable relative density is 90% or higher.

The REAG phase in the ceramic plates according to this invention can be synthesized by forming and sintering a powder prepared by mixing compounds in a predetermined given volume percentage. It may also be possible, before forming and sintering, to synthesize a powder of the REAG-phase by mixing, pre-sintering, pulverizing and/or electromelting.

Powders of $Y_2O_3$, $Er_2O_3$, $Yb_2O_3$, $Dy_2O_3$, $Al_2O_3$, $Si_3N_4$ and BN can be used as materials. From the viewpoint of a good sintering property, material powders approximately between 0.2 μm and 5 μm in size are preferable.

Forming can be carried out by any of uniaxial mold pressing, cold isostatic pressing (CIP), casting and injection molding.

Sintering can be carried out by any of atmospheric sintering, gas-pressure sintering, hot pressing and hot isostatic pressing (HIP). To inhibit oxidation of material powders during sintering, it is preferable to carry out sintering in inert gases such as nitrogen and argon gases. The desired properties are likely to be obtained if sintering is carried out between 1650° C. and 1800° C.

The ceramic plates according to this invention comprise a REAG phase of 10 to 90 vol. %, a Sialon phase of 5 to 50 vol. %, a BN phase of 5 to 50 vol. % and an amorphous phase of more than 0 to not greater than 20 vol. %, with the REAG phase consisting of at least one rare-earth aluminum garnet phase chosen from the YAG, ErAG, YbAG and DyAG phases and the Sialon phase having a chemical formula $Si_{6-z}Al_zO_zN_{8-z}$ wherein Z is between 0.05 and 1.9. A relative density of 80% or more is particularly preferable.

Combinations of these features provide thermally, mechanically and chemically stable ceramic plates for side dams of twin-drum continuous strip casters having high corrosion, wear and thermal shock resistances and low thermal conductivity.

EXAMPLES

Tables 1 and 2 show the phases and properties of ceramic plates according to this invention and examples prepared for comparison are shown, with the results of casting.

Powders of $Y_2O_3$, $Er_2O_3$, $Yb_2O_3$, $Dy_2O_3$, $Al_2O_3$, $Si_3N_4$ and BN were mixed, formed by cold isostatic pressing (CIP) under a pressure of 140 MPa, sintered in nitrogen gas at 1750° C. for 4 hours to produce plates of 20 mm thick. The plates thus obtained were made into side dam members.

Crystal phases of the obtained plates were examined by X-ray diffraction to identify crystal structure. Volume proportions of the individual phases were determined by the area proportions thereof determined by micro-texture observation through a transmission electron microscope.

Relative densities were determined by Archimedes' method and by measuring the porosity of the mirror-polished surfaces by an optical microscope.

Corrosion resistance was determined by measuring the erosion rate of test specimens immersed in a molten metal of SUS304 stainless steel at 1550° C. in argon gas. Wear resistance was determined by measuring the specific abrasion caused by rotating test drums in a hot atmosphere at 950° C. with a pressure of 4.5 kg/cm². Thermal shock resistance was determined by suddenly dropping test specimens kept at a given temperature into water and measuring the temperature difference ΔT, which is expressed by the upper limit temperature at which strength drop does not occur, created by water quenching. Thermal conductivity was determined by the laser flash method at 800° C.

FIG. 1 is a perspective view of a twin-drum continuous strip caster which consists essentially of a pair of cooling drums 1a, 1b (for example, made of copper alloy) and side dams 2a, 2b. The twin-drum continuous strip caster continuously casts thin, wide section 4 by cooling and solidifying molten metal 3 in a liquid metal pool on the rotating drums 1a, 1b.

The side dams 2a, 2b are pressed from both sides against the end faces of the cooling drums by a pressing system comprising a hydraulic actuator so that the molten metal does not leak from the ends of the cooling drums.

Figure 2:
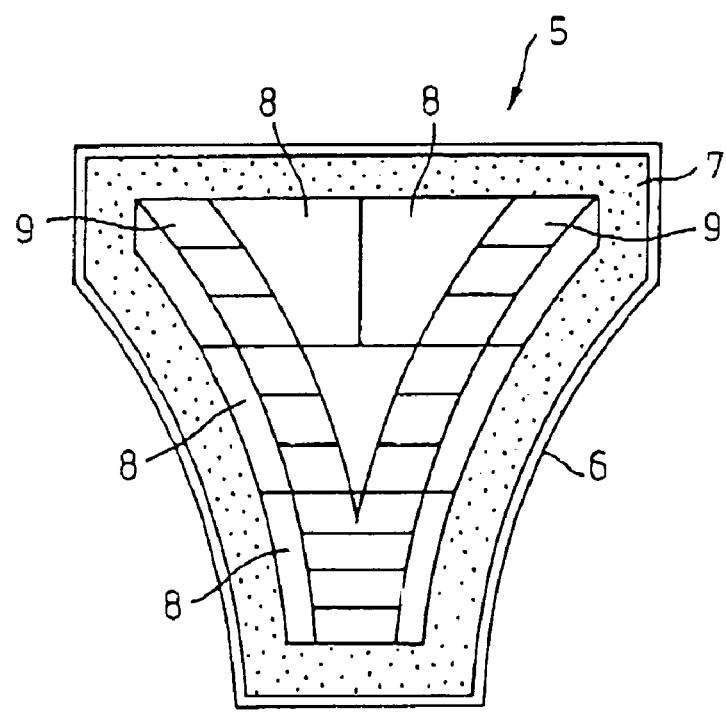
FIG. 2 is a front view of a side dam.

FIG. 2 shows the whole of the side dam. A side dam case 6 (for example, made of SS400 steel) forming the frame of each side dam holds a heat-insulating material 7 of a monolithic refractory (for example, made of fused $SiO_2$) into which base members 8 (for example, made of high alumina brick) are planted. Multiple ceramic plates 9 (17 plates in the figure) are bonded to the part of the base members 8 that faces the peripheral edge (flange portion) of the cooling drums.

Casting tests were conducted by using the twin-drum continuous strip caster and side dam shown in FIGS. 1 and 2. Thin, wide section SUS304 stainless steel strip having a width of 1330 mm and a thickness of 4 mm was continuously cast for two hours. While the molten steel was kept at 1550° C., the side dams were pressed against the moving surfaces of the water-cooled drums with a pressure of 0.2 MPa and the water-cooled drums were rotated with respect to the ceramic plates at a speed of 1 m/sec. Casting was preceded by preheating with a silicon carbide heater (not shown) integrated into the frame of the side dams.

For the purpose of comparison, ceramic plates comprising a BN phase of 50 vol. % and an AlN phase of 50 vol. % and ceramic plates comprising a BN phase of 20 vol. %, a $Si_3N_4$ phase of 75 vol. % and an amorphous phases of 5 vol. % were also used. Tables 1 and 2 show the properties and results of casting tests with the ceramic plates according to this invention and those prepared for the purpose of comparison.

The ceramic plates according to this invention have REAG, Sialon (Z=0.05 and 1.9) and BN phases as crystalline phases. The erosion rate by molten steel and the specific abrasion in the rotating tests, for examples of this invention, at 0.2 mm/hr. and 2.5 μm/m, were less than those for the comparison examples. The temperature difference created by water quenching was as large as 450° C. or more, and the thermal conductivity was as small as 9 W/(m·K).

In the casting tests with the ceramic plates according to this invention, properly shaped sections were stably cast for two hours without causing any leakage of molten steel. In the casting tests with the ceramic plates prepared for the purpose of comparison, molten steel often leaked from the interface between both ends of the rotating drums and the side dams. The side dams lost their function in a short time and it became impossible to continue casting.

TABLE 1

|  |  | Examples of the invention ||||| 
| --- | --- | --- | --- | --- | --- | --- |
|  |  | 1 | 2 | 3 | 4 | 5 |
| YAG phase | vol. % | 29 | — | — | 25*1 | 27*2 |
| ErAG phase | vol. % | — | 46 | — | — | — |
| YbAG phase | vol. % | — | — | 33 | — | 20*2 |
| DyAG phase | vol. % | — | — | — | 10*1 | — |
| Sialon phase | vol. % | 31 | 29 | 45 | 30 | 20 |
|  | (Z value) | (1.3) | (0.1) | (0.5) | (0.8) | (0.3) |
| $Si_3N_4$ phase | vol. % | — | — | — | — | — |
| AlN phase | vol. % | — | — | — | — | — |
| BN phase | vol. % | 30 | 22 | 15 | 35 | 28 |
| Amorphous phase | vol. % | 10 | 3 | 7 | — | 5 |
| Relative density | % | 95 | 94 | 97 | 91 | 95 |
| Erosion by molten steel | mm/hr | 0.0 | 0.1 | 0.2 | 0.1 | 0.0 |
| Specific abrasion | μm/m | 2.1 | 1.5 | 2.5 | 1.8 | 1.9 |
| Thermal shock resistance ΔT | ° C. | 500 | 450 | 500 | 450 | 500 |
| Thermal conductivity | W/(m · K) | 9.0 | 7.0 | 8.0 | 6.5 | 6.0 |
| Casting test |  | 2 hours Complete Casting | 2 hours Complete Casting | 2 hours Complete Casting | 2 hours Complete Casting | 2 hours Complete Casting |

Note)
*1 and *2 formed REAG solid solutions.
Vol. % was calculated from the proportions of materials.

TABLE 2

|  |  | Examples for comparison ||||| 
| --- | --- | --- | --- | --- | --- | --- |
|  |  | 6 | 7 | 8 | 9 | 10 |
| YAG phase | vol. % | 10 | 18 | 80 | — | — |
| ErAG phase | vol. % | — | — | — | — | — |
| YbAG phase | vol. % | — | — | — | — | — |
| DyAG phase | vol. % | — | — | — | — | — |
| Sialon phase | vol. % | 55 | 21 | — | — | — |
|  | (Z value) | (2.0) | (0.02) |  |  |  |
| $Si_3N_4$ phase | vol. % | — | — | — | — | 75 |
| AlN phase | vol. % | — | — | — | 50 | — |
| BN phase | vol. % | 10 | 54 | 20 | 50 | 20 |
| Amorphous phase | vol. % | 25 | 7 | — | — | 5 |
| Relative density | % | 90 | 86 | 94 | 78 | 76 |
| Erosion by molten steel | mm/hr | 1.5 | 2.5 | 0.4 | 2.8 | 3.6 |
| Specific abrasion | μm/m | 0.5 | 12 | 0.8 | 6.1 | 3.1 |
| Thermal shock resistance ΔT | ° C. | 300 | 400 | 200 | 350 | 400 |
| Thermal conductivity | W/(m · K) | 12 | 11 | 4.5 | 14 | 6.0 |
| Casting test |  | 0.5 hour Molten metal leakage | 1 hour Molten metal leakage | 0.5 hour Molten metal leakage | 0.3 hour Molten metal leakage | 1.5 hours Molten metal leakage |

INDUSTRIAL APPLICABILITY

The present invention, that provides ceramic plates for side dams of twin-drum continuous strip casters having high corrosion, wear and thermal shock resistances and low thermal conductivity, has great industrial applicability.

The invention claimed is:

1. Ceramic plates for side dams of twin-drum continuous strip casters; comprising a REAG phase of 10 to 90 vol. %, a Sialon phase of 5 to 50 vol. % and a BN phase of 5 to 50 vol. %.

2. Ceramic plates for side dams of twin-drum continuous strip coasters; comprising a REAG phase of 10 to 90 vol. %, a Sialon phase of 5 to 50 vol. %, a BN phase of 5 to 50 vol. % and an amorphous phase of more than 0 to not greater than 20 vol. %.

3. Ceramic plates for side dams of twin-drum continuous strip casters claim 1, in which said REAG phase comprises at least one rare-earth aluminum garnet phase selected from YAG, ErAG, YbAG and DyAG phases.

4. Ceramic plates for side dams of twin-drum continuous strip casters according to claim 1, in which the value of Z, in the chemical formula $Si_{6-z}Al_zO_zN_{8-z}$ of said Sialon phase, in between 0.05 and 1.9.

5. Ceramic plates for side dams of twin-drum continuous strip casters according to claim 1, in which said ceramic plates have a relative density of not less than 80%.

* * * * *